(12) United States Patent
Pedretti

(10) Patent No.: US 9,146,043 B2
(45) Date of Patent: Sep. 29, 2015

(54) PARABOLIC COLLECTOR

(75) Inventor: Mauro Pedretti, Biasca (CH)

(73) Assignee: Airlight Energy IP SA, Biasca (CH)

( * ) Notice: Subject to any disclaimer, the term of this patent is extended or adjusted under 35 U.S.C. 154(b) by 0 days.

(21) Appl. No.: 13/511,026

(22) PCT Filed: Dec. 16, 2010

(86) PCT No.: PCT/CH2010/000313
§ 371 (c)(1),
(2), (4) Date: Jul. 17, 2012

(87) PCT Pub. No.: WO2011/072410
PCT Pub. Date: Jun. 23, 2011

(65) Prior Publication Data
US 2012/0266868 A1    Oct. 25, 2012

(30) Foreign Application Priority Data
Dec. 17, 2009   (CH) ..................................... 1942/09

(51) Int. Cl.
*F24J 2/08*       (2006.01)
*F24J 2/12*       (2006.01)
(Continued)

(52) U.S. Cl.
CPC ................. *F24J 2/125* (2013.01); *F24J 2/1052* (2013.01); *F24J 2/5233* (2013.01); *F24J 2/541* (2013.01); *Y02E 10/42* (2013.01); *Y02E 10/47* (2013.01); *Y10T 29/49826* (2015.01)

(58) Field of Classification Search
CPC . H01Q 15/163; H01Q 15/162; H01Q 15/161; H01Q 15/16; H01Q 15/167; H01Q 15/141; F24J 2/145; F24J 2002/1004; F24J 2002/1019; F24J 2002/1028; F24J 2002/1052; F24J 2002/109; F24J 2002/1085; F24J 2/13; F24J 2/12; F24J 2/08; F24J 2/125; F24J 2/10; G02B 5/10; G02B 19/0042
USPC ................. 126/683–685, 688, 690, 689, 698; 359/847
See application file for complete search history.

(56) References Cited

U.S. PATENT DOCUMENTS 1,661,473 A   3/1928   Goddard et al.
1,683,266 A   9/1928   Shipman
(Continued)

FOREIGN PATENT DOCUMENTS

AT          378599      8/1985
AU      2009230775 B1   3/2010
(Continued)

OTHER PUBLICATIONS

Mootz, Frank, "International Search Report", for PCT/CH2009/000105 as mailed Oct. 22, 2009, 12 pages.
(Continued)

*Primary Examiner* — Kenneth Rinehart
*Assistant Examiner* — Jason Lau
(74) *Attorney, Agent, or Firm* — Winstead PC

(57) ABSTRACT

A parabolic collector for the concentration of solar radiation has a reflective surface which is approximated to an ideal paraboloid and has a number of individual collectors. According to the invention, individual collectors are provided with a pressure cell with a concentrator formed from a flexible film, whereby, under operating pressure conditions, the concentrator is curved differently in a predetermined manner in a first and in a second direction for approximating the ideal paraboloid, such that the radius of curvature in the first direction is greater than that in the second direction. The production method for such a concentrator consists in the fact that the outline of the individual collectors is designed in the outline of the parabolic collector, the true dimensions of the individual collectors being determined from the intersection of cylinders positioned on the outline with the paraboloid of the parabolic collector.

20 Claims, 6 Drawing Sheets

Figure 1:
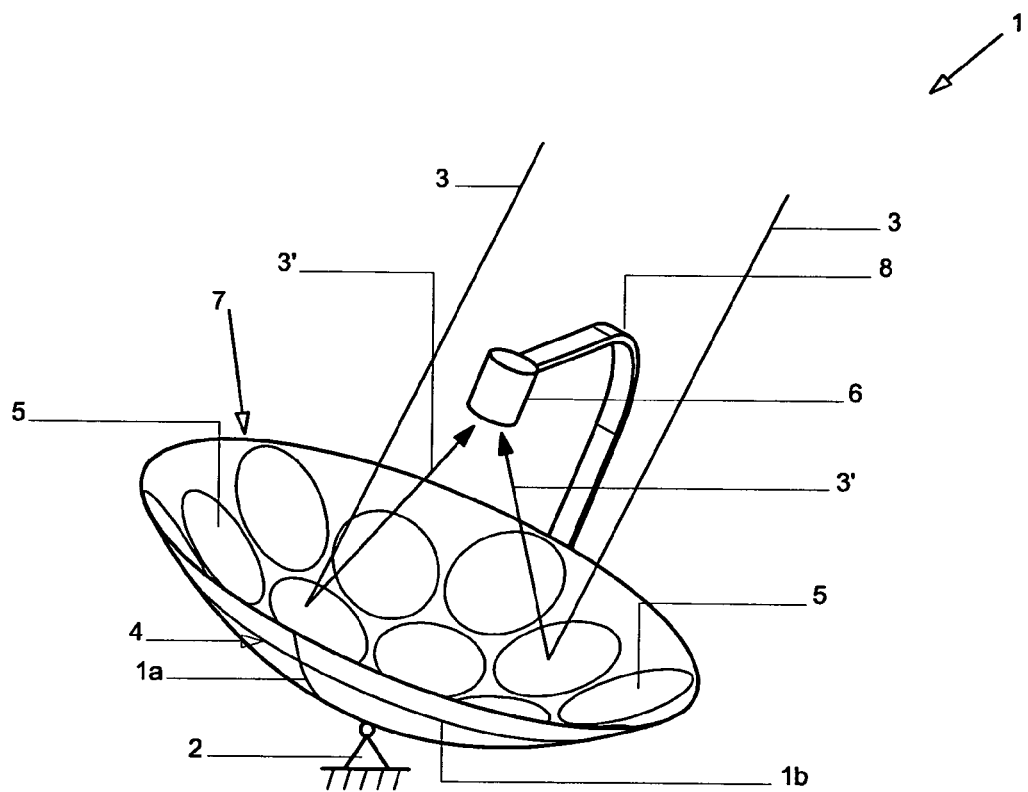

(51) Int. Cl.
*F24J 2/10* (2006.01)
*F24J 2/52* (2006.01)
*F24J 2/54* (2006.01)

(56) References Cited

U.S. PATENT DOCUMENTS

| | | | |
|---|---|---|---|
| 1,880,938 A | 10/1932 | Emmet | |
| 3,153,789 A | 10/1964 | Ashton | |
| 3,174,397 A * | 3/1965 | Sanborn | 359/853 |
| 3,599,218 A * | 8/1971 | Williamson et al. | 343/840 |
| 3,924,604 A * | 12/1975 | Anderson | 126/606 |
| 3,982,527 A * | 9/1976 | Cheng et al. | 126/690 |
| 4,051,834 A | 10/1977 | Fletcher et al. | |
| 4,131,485 A | 12/1978 | Meinel et al. | |
| 4,149,523 A | 4/1979 | Boy-Marcotte et al. | |
| 4,172,443 A * | 10/1979 | Sommer | 126/680 |
| 4,210,102 A * | 7/1980 | Dosmann | 122/20 B |
| 4,220,140 A * | 9/1980 | Francia | 126/658 |
| 4,226,502 A | 10/1980 | Gunzler | |
| 4,252,107 A | 2/1981 | Horton | |
| 4,491,125 A | 1/1985 | Sainsbury | |
| 4,505,260 A | 3/1985 | Metzger | |
| 4,543,945 A * | 10/1985 | Hattan | 126/584 |
| 4,616,909 A * | 10/1986 | Dane | 359/853 |
| 4,628,142 A | 12/1986 | Hashizume | |
| 4,672,389 A * | 6/1987 | Ulry | 343/915 |
| 4,756,301 A * | 7/1988 | Dane | 126/690 |
| 4,811,034 A * | 3/1989 | Kaminskas | 343/915 |
| 4,841,946 A | 6/1989 | Marks | |
| 4,887,589 A | 12/1989 | Frohardt et al. | |
| 5,114,101 A * | 5/1992 | Stern et al. | 244/172.8 |
| 5,154,163 A | 10/1992 | Rabl | |
| 5,261,390 A | 11/1993 | Lasich | |
| 5,365,920 A | 11/1994 | Lechner | |
| 5,660,644 A | 8/1997 | Clemens | |
| 5,680,145 A * | 10/1997 | Thomson et al. | 343/915 |
| 6,373,449 B1 | 4/2002 | Bokulic et al. | |
| 6,984,050 B2 * | 1/2006 | Nakamura | 359/853 |
| 7,905,227 B2 * | 3/2011 | Luconi et al. | 126/696 |
| 8,235,035 B2 | 8/2012 | Winger et al. | |
| 2003/0201949 A1 * | 10/2003 | Harless | 343/915 |
| 2004/0126594 A1 | 7/2004 | Rubbia et al. | |
| 2006/0033674 A1 * | 2/2006 | Essig et al. | 343/912 |
| 2006/0168960 A1 | 8/2006 | Krouse | |
| 2006/0207590 A1 | 9/2006 | Levin | |
| 2006/0273233 A1 * | 12/2006 | Pedretti et al. | 248/560 |
| 2007/0094937 A1 * | 5/2007 | Pedretti | 52/2.11 |
| 2008/0017499 A1 | 1/2008 | Brockhoff | |
| 2009/0071154 A1 | 3/2009 | Penciu | |
| 2009/0084375 A1 * | 4/2009 | Xie | 126/684 |
| 2009/0114265 A1 * | 5/2009 | Milbourne et al. | 136/246 |
| 2009/0139512 A1 | 6/2009 | Lima | |
| 2009/0272375 A1 * | 11/2009 | Pedretti | 126/696 |
| 2009/0277441 A1 * | 11/2009 | Jensen | 126/643 |
| 2010/0037953 A1 | 2/2010 | Xie | |
| 2010/0043779 A1 | 2/2010 | Ingram | |
| 2010/0206296 A1 | 8/2010 | Matalon | |
| 2010/0229850 A1 | 9/2010 | Sankrithi | |
| 2011/0100355 A1 | 5/2011 | Pedretti | |
| 2011/0100419 A1 | 5/2011 | Maeda | |
| 2011/0114083 A1 | 5/2011 | Pedretti | |
| 2011/0220094 A1 | 9/2011 | Mills et al. | |
| 2012/0031095 A1 | 2/2012 | Pedretti | |
| 2012/0174911 A1 | 7/2012 | Pedretti | |
| 2012/0266868 A1 | 10/2012 | Pedretti | |
| 2013/0247961 A1 | 9/2013 | Pedretti | |
| 2014/0026944 A1 | 1/2014 | Pedretti | |
| 2014/0332054 A1 | 11/2014 | Ambrosetti et al. | |

FOREIGN PATENT DOCUMENTS

| | | |
|---|---|---|
| CH | 00462/08 A | 2/1910 |
| CH | 2008/0462 | 3/2008 |
| CH | 699229 A2 | 1/2010 |
| CH | 704005 A2 | 4/2012 |
| DE | 386264 | 12/1923 |
| DE | 117 107 A1 | 12/1975 |
| DE | 2631551 A1 | 2/1978 |
| DE | 2733915 A1 | 2/1979 |
| DE | 27 38 667 A1 | 3/1979 |
| DE | 2738667 A1 | 3/1979 |
| DE | 3920186 A1 | 1/1991 |
| DE | 3929537 A1 | 3/1991 |
| DE | 9302607 U1 | 5/1993 |
| DE | 4413056 C1 | 9/1995 |
| DE | 19923141 A1 | 11/2000 |
| DE | 20214823 U1 | 2/2004 |
| DE | 20 2006 016138 U1 | 2/2007 |
| EP | 0025834 A2 | 4/1981 |
| EP | 1903155 A1 | 3/2008 |
| EP | 2366963 A1 | 9/2011 |
| FR | 1319144 A | 2/1963 |
| FR | 2362347 A1 | 3/1978 |
| FR | 2398982 A1 | 2/1979 |
| FR | 2497328 A1 | 7/1982 |
| FR | 2497927 A | 7/1982 |
| FR | 2497927 A1 | 7/1982 |
| FR | 2567995 A1 | 1/1986 |
| JP | 2003074988 A | 3/2003 |
| WO | WO-82/00366 A1 | 2/1982 |
| WO | WO-88/03635 A1 | 5/1988 |
| WO | WO-90/10182 A1 | 9/1990 |
| WO | WO-01/55651 A1 | 8/2001 |
| WO | WO-2004/011857 A1 | 2/2004 |
| WO | WO-2007/051928 A2 | 5/2007 |
| WO | WO-2008/037108 A2 | 4/2008 |
| WO | WO-2009091827 A2 | 7/2009 |
| WO | WO-2009/117840 A2 | 10/2009 |
| WO | WO-2009/135330 A1 | 11/2009 |
| WO | WO-2010/017594 A1 | 2/2010 |
| WO | WO-2010/037243 A2 | 4/2010 |
| WO | WO-2010/078668 A2 | 7/2010 |
| WO | WO-2010/099516 A1 | 9/2010 |

OTHER PUBLICATIONS

Van Dooren, Marc, "International Search Report," for PCT/CH2009/000310 as mailed Jan. 21, 2011, 4 pages.
Oliveira, Casimiro, "International Search Report", for PCT/CH2009/000147 as mailed Jul. 6, 2009, 3 pages.
Oliveira, Casimiro, "International Search Report" for PCT/CH2010/000003 as mailed Jul. 22, 2010, 8 pages.
Merkt, Andreas, International Search Report for PCT/CH2007/000480 as mailed Jul. 28, 2008, 6 pages.
Mootz, Frank, "International Search Report" for PCT/CH2010/000313 as mailed Apr. 21, 2011, 3 pages.
Mootz, Frank, "International Search Report", for PCT/CH2010/000313 as mailed Apr. 21, 2011, 3 pages.
U.S. Appl. No. 14/409,400, Ambrosetti.
U.S. Appl. No. 14/397,723, Pedretti-Rodi.
Mootz, Frank, International Search Report for PCT/CH2013/000074, Sep. 8, 2013 [4 pages].
Merkt, Andreas, International Search Report for PCT/CH2013/000109, Feb. 5, 2014 (6 pages).
Lynden-Bell, D., "Exact Optics: A Unification of Optical Telescope Design," Mon. Not. R. Astron. Soc. 334, 2002, pp. 787-796.
Ostroumov, Natalia, et al., "Panorama of Dual-Mirror Aplanats for Maximum Concentration," Applied Optics, vol. 48, No. 26, Sep. 10, 2009, pp. 4926-4931.
Gordon, Jeffrey M., et al., "Optical Performance at the Thermodynamic Limit with Tailored Imaging Designs," Applied Optics, vol. 44, No. 12, Apr. 20, 2005, pp. 2327-2331.
Axters, Michael, "International Search Report," prepared for PCT/CH2012/000260, as mailed Jul. 4, 2013, 6 pages.
Von Mittelstaedt, A., "International Search Report", for PCT/CH2011/000258 as mailed Jun. 13, 2012, 7 pages.
Von Mittelstaedt, A., "International Search Report", for PCT/CH2011/000257, as mailed Mar. 13, 2012, 3 pages.
Collares-Pereira, M., High Concentration Two-Stage Optics for Parabolic Trough Solar Collectors With Tubular Absorber and Large Rim Angle, Solar Energy, vol. 47, No. 6, pp. 457-466 (1991).

* cited by examiner

PARABOLIC COLLECTOR

The present invention relates to a parabolic collector for the concentration of solar radiation according to the preamble of Claim 1, an individual collector according to Claim 11 and a method for the production of the parabolic collector according to Claim 13.

Parabolic collectors, the reflective surfaces of which have a number of individual collectors, are known. Generally, parabolic collectors of this type have a diameter of 5 to 10 m, individual mirrors being attached to a framework in such a manner that an ideal (i.e. geometrically correct) paraboloid is approximated as well as is possible. Although the intermediate spaces present between the mirrors result in losses, these can readily be accepted due to the enormous production costs of a continuous parabolic mirror of this size however. In addition, the individual mirrors are often only spherically or not at all curved, but orientated in the framework onto the focal point of the (ideal) paraboloid, so that on the whole an acceptable concentration of the sunlight results with reasonable costs.

An industrial use of parabolic mirrors of this type is today not or barely existent, in spite of the construction of various relatively large solar power plants.

Three basic forms of solar thermal power plant are currently in use: Dish/Sterling systems, which use parabolic collectors of the above-mentioned type, solar tower power plant systems, in which the solar radiation is likewise concentrated onto a point, and parabolic trough systems, in which the solar radiation is concentrated onto a line.

As mentioned above, the generation of renewable energy by means of dish/Sterling systems has not become widespread. Large plants built as solar tower systems, which use a field of mirrors are operating however, for example the plants PS10 and primarily PS20 in Spain, PS20 achieving a capacity of 20 MW. In 2013, in addition to PS20, a third solar tower system with a capacity of 300 MW shall enter into operation. The temperatures generated in the solar tower lie at 1000° C.

Parabolic trough power plants are today in operation in larger numbers and already operate comparatively economically. Parabolic trough power plants have (like the solar tower systems) large numbers of collectors, long concentrators with a small transverse dimension, which therefore do not have a focal point, but a focal line, being provided in the case of parabolic trough power plants. These linear concentrators currently have a length of 20 m to 150 m. An absorber pipe runs in the focal line for the concentrated heat (up to almost 500° C.) and transports the latter to the power plant. Thermal oil or superheated steam for example are possibilities for the transport medium.

The 9 SEGS parabolic trough plants in Southern California together produce an output of approx. 350 MW. The power plant "Nevada Solar One", connected to the mains in 2007, has trough collectors with 182,400 curved mirrors, which are arranged on an area of 140 hectares, and produces 65 MW.

In other words, it is the case that electricity is today produced by solar power plants (essentially by means of parabolic trough power plants) on an industrial scale, trough collectors with a pressure cell having been suggested for example in accordance with WO 2008/037108 of the same applicant, in order to lower the costs of parabolic trough power plants to such an extent that electricity can be produced in a manner equally expensive to or in the future cheaper than is the case with conventional power plants.

More and more, research is concerned with renewable fuels, such as hydrogen for example, which can be burned environmentally neutrally with oxygen to form water. The thermolysis, that is to say for the production of hydrogen from water, also takes place environmentally neutrally, temperatures of more than 2200° C. being required to this end however. A technology which can be used broadly is today not yet in existence. Lower temperatures, but still temperatures in the range of 1500° C. to 2000° C., require two-stage water-splitting cycles which are based on so-called metal-oxide redox systems.

In this case for example, in a first step at a temperature of approx. 2000° C., zinc oxide is broken down into metallic zinc and oxygen, whereby the oxygen can be discharged into the atmosphere or re-used. In the second step, the reaction of zinc with water takes place, hydrogen being released and zinc changes back into zinc oxide. The hydrogen can then be burned as energy carrier in an environmentally neutral manner as mentioned above. To this end, reference is made to the article "Wasserstoff aus Wasser and Sonnenenergie" [Hydrogen from water and solar energy] by Anton Meier, Christian Wieckert and Aldo Steinfels in: Alternative Energietechnik, Bulletin SEV/VSE 24/25 05.

It is obvious that the circuit of renewable fuels can be kept completely environmentally neutral if the production of the renewable fuels takes place by means of energy generated in solar power plants. The required high temperatures require a high concentration of the sunlight however, the upper limit of which in turn depends on the Earth-Sun geometry, that is to say on the opening angle of the solar disc observed from the Earth. It follows from this opening angle of 0.27° that the (in reality today not achieved even approximately) theoretically maximum possible concentration factor lies at 213 for trough collectors and 45,000 for parabolic collectors.

It follows that recourse cannot be had to trough collectors for the provision of solar energy at high temperatures, in spite of their substantial prevalence.

Accordingly, it is the object of the present invention to provide a collector with a concentration which exceeds that of the known trough collectors and which can be produced inexpensively even in large dimensions and so is also suitable for use on an industrial scale in solar power plants.

This object is achieved by means of a parabolic collector with the characterising features of Claim 1, an individual collector according to Claim 11 and a method for the production of a parabolic collector according to Claim 13.

As a result of the fact that the individual collectors have a concentrator made from a flexible film which can be loaded with pressure, their production in series is possible inexpensively, not only in the case of small, but also in the case of large dimensions, so that the parabolic collector itself can likewise be produced inexpensively and in series at relatively large dimensions. As a result of the fact that the concentrator of the individual collectors is curved differently in different directions, an individual collector of this type can be used in a parabolic collector in the first place: The curvature in the one direction must correspond to the parabolic shape and the curvature in the other direction must correspond to the arcuate circumference of the collector at least approximately.

As a result of the fact that the dimensions of the individual collectors can be determined from the outline of the arrangement, the geometry of the individual collectors can be determined in a simple manner for flawless fitting in the geometrically complicated paraboloidal reflective surface of the collector.

The invention is explained in more detail hereinafter on the basis of the figures.

Figure 2:
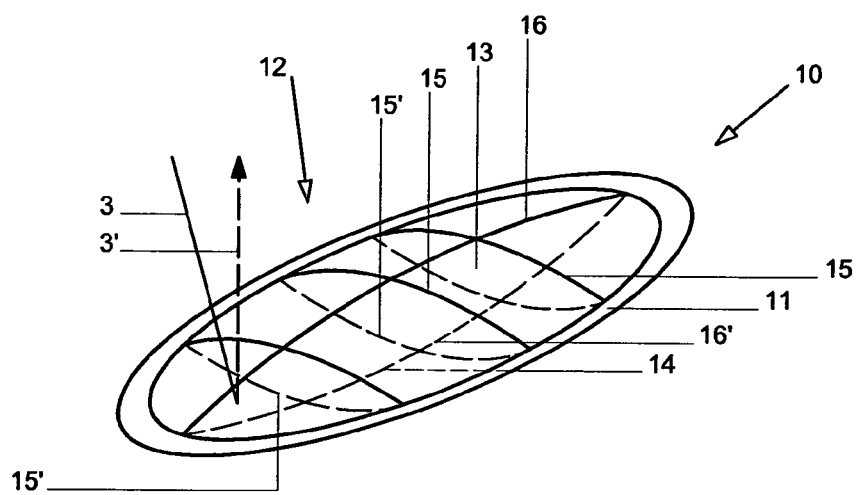
Figure 3:
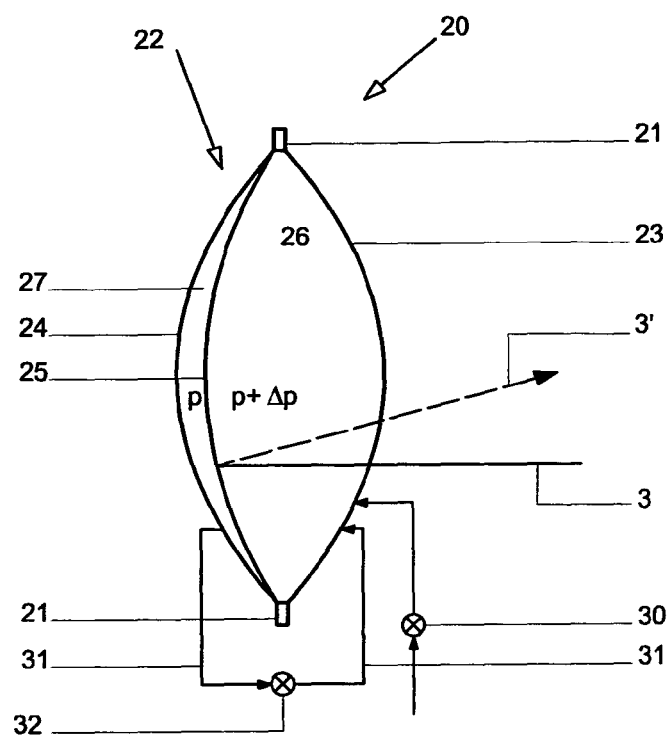

In the figures:

FIG. 1 schematically shows a parabolic collector according to the invention,

FIG. 2 schematically shows an individual collector, as can be used in the parabolic collector according to FIG. 1, FIG. 3 shows a cross section through an embodiment of the collector of FIG. 2

Figure 4:
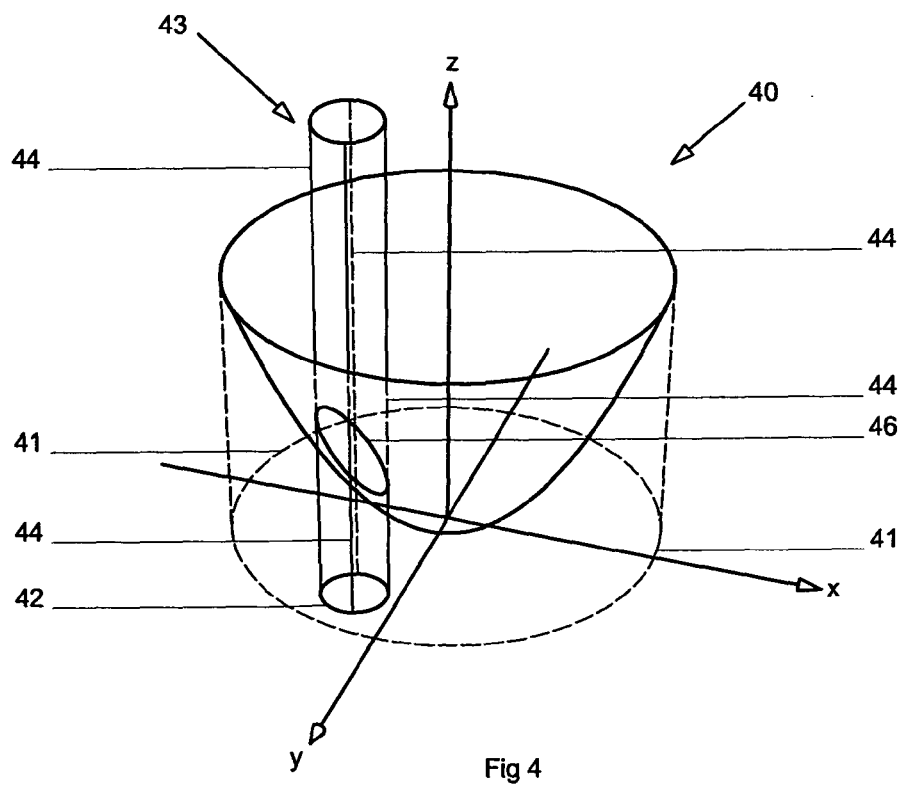
Figure 5:
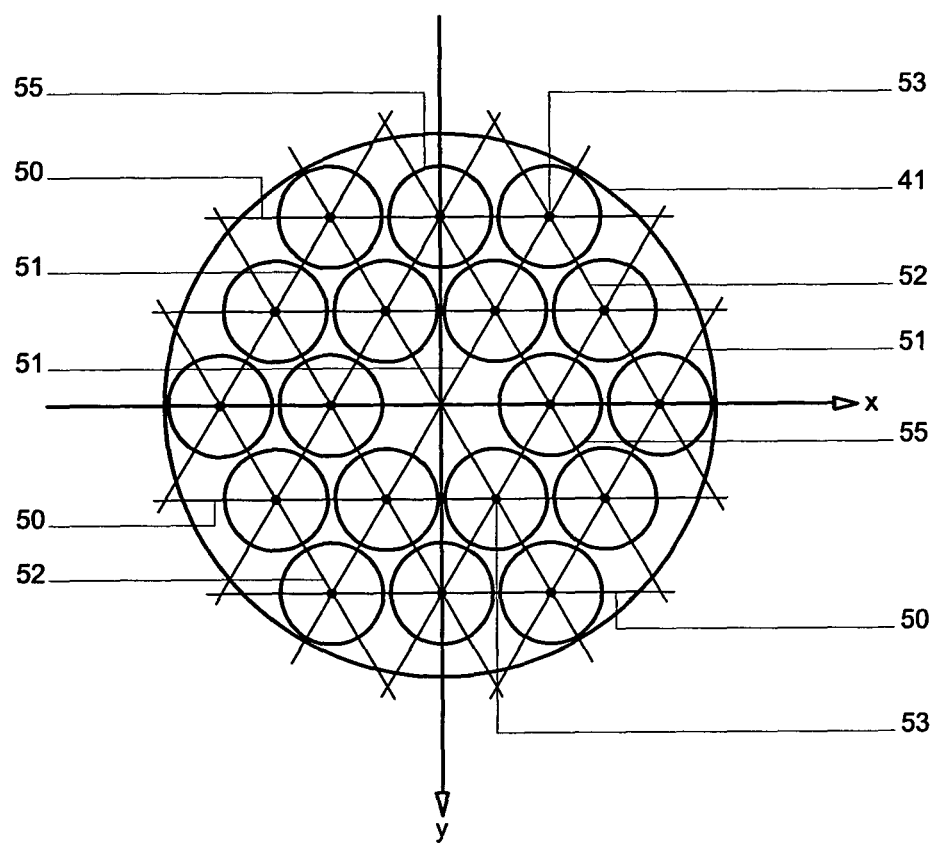
Figure 6A:
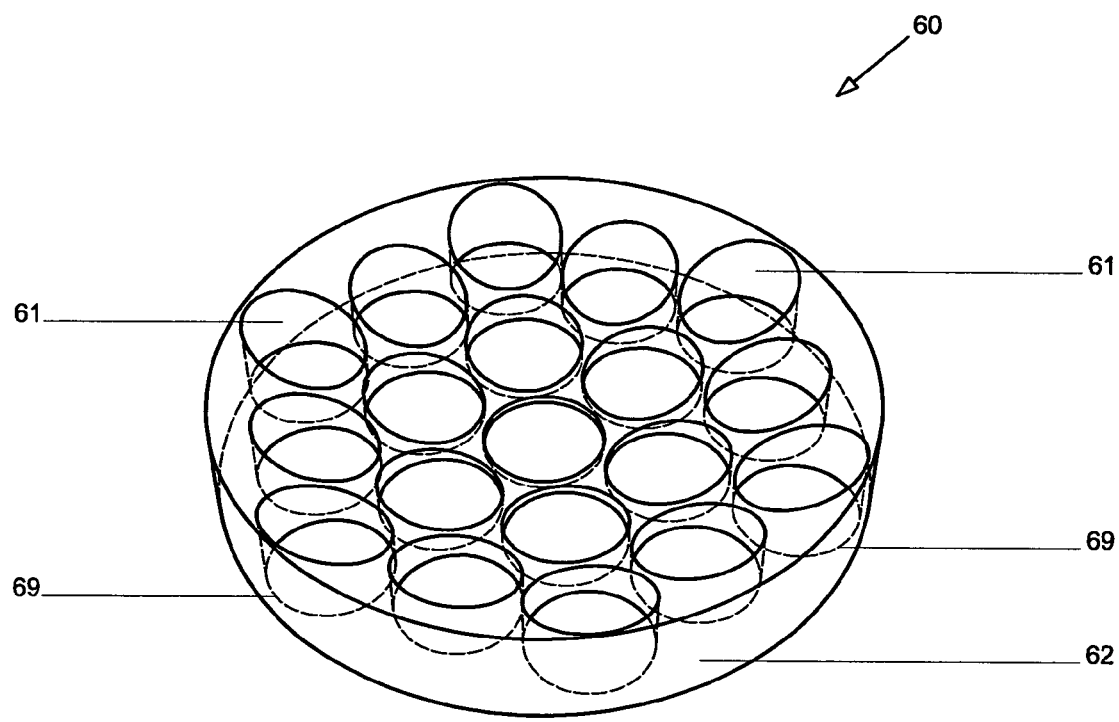
Figure 6B:
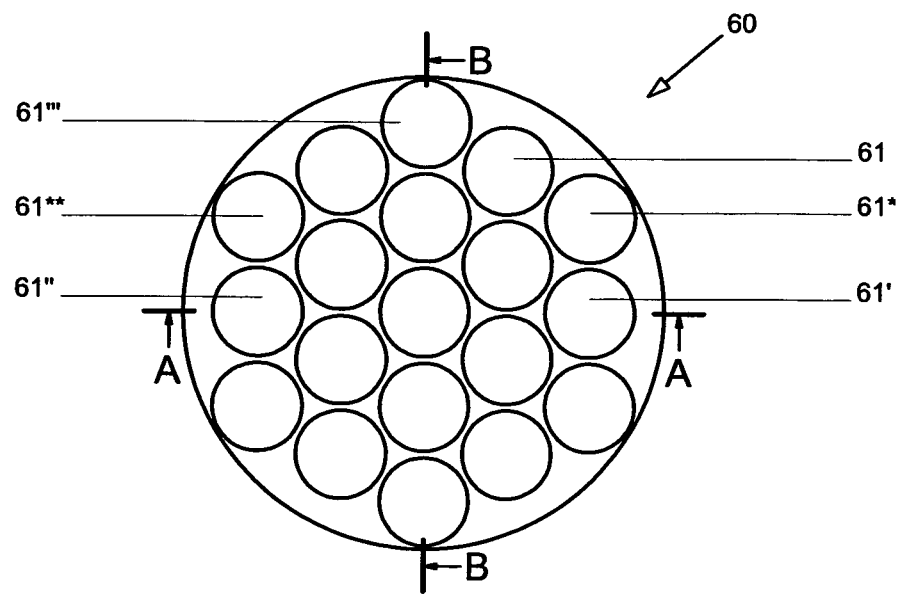
Figure 6C:
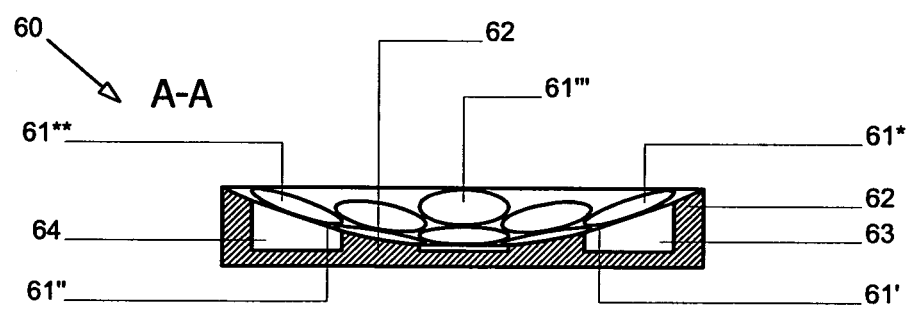
Figure 7:
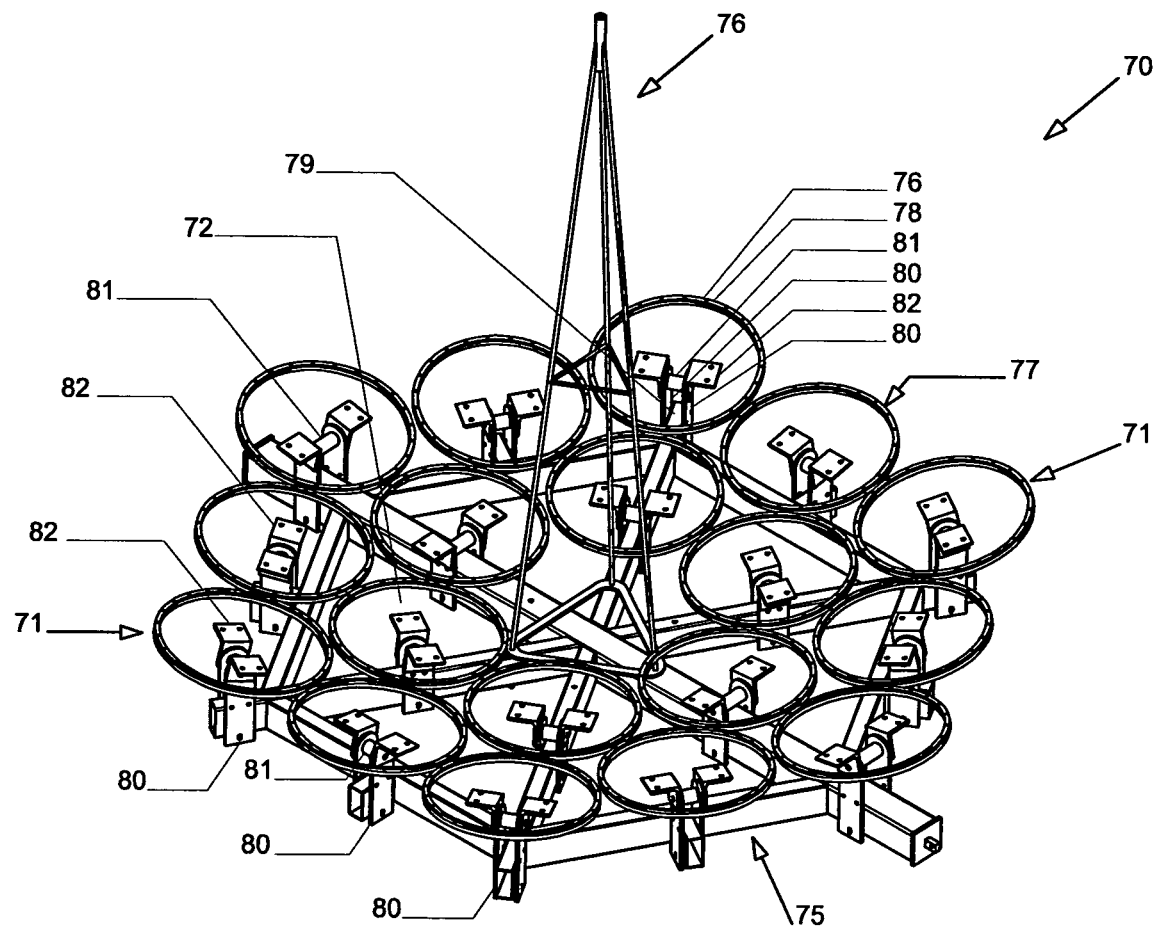

FIG. 4 schematically shows how an individual collector according to FIG. 2 can be determined in terms of its dimensions so that it can be fitted into the parabolic collector in a serviceable manner, and FIG. 5 shows a model for the arrangement of individual collectors in a parabolic collector according to FIG. 1, FIG. 6a schematically shows a first exemplary embodiment of the parabolic collector according to the invention, the individual collectors of which are integrated into a framework made from concrete, FIG. 6b shows the parabolic collector of FIG. 6a from above, FIG. 6c shows a section along the line AA from FIG. 6b, FIG. 7 shows a further exemplary embodiment with smaller dimensions, suitable for a concentration of 4000.

Figure 6D:
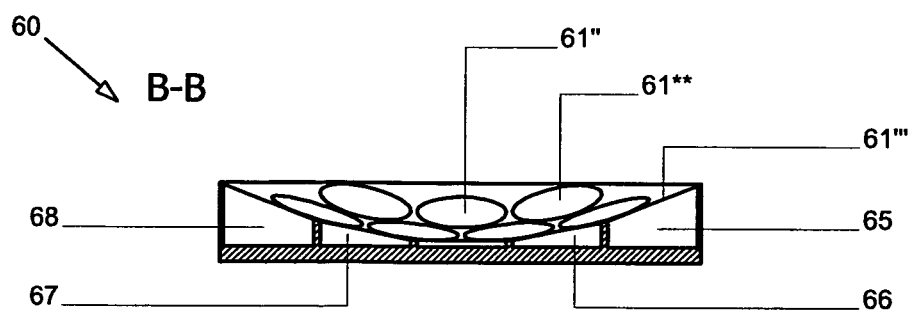

FIG. 6d shows a section along the line BB from FIG. 6b,

FIG. 1 shows a parabolic collector 1, a surface line 1a and also a circumferential line 1b being drawn in on its outside as auxiliary lines. The collector 1 is pivotably mounted on a schematically illustrated bearing 2 so that it can continuously be orientated to the moving sun. Solar rays 3 fall onto the interior of the collector framework 4, which is likewise only illustrated schematically, in which collector framework individual collectors 5 are arranged. The individual collectors 5 are constructed in such a manner that they reflect the solar rays 3 falling onto them towards an absorber element 6, in which temperatures of the desired magnitude of more than 1000° C., up to 2000° C. or 2500° C. and more can be achieved due to the high concentration of the radiation 3.

The individual collectors 5 together form the reflective surface 7 of the parabolic collector 1, which is approximated as well as possible, but not completely to an ideal paraboloid. Accordingly, the reflected rays 3' are not concentrated into a focal point, but rather into a focal point region. The extent of the focal point region (which can also be asymmetric) depends on the layout of the actual parabolic collector which the person skilled in the art determines on site in accordance with the requirements, and is absolutely wanted in a minimal dimension, as, in the case of a focal point region which is too small, temperature peaks would occur which are even higher than the above mentioned desired temperatures and could therefore destroy the absorber element 6.

In the figure, the absorber element 6 is hung on a schematically illustrated carrier 8, in which the lines for the medium transporting the heat are also arranged. Alternatively, a reactor can be provided at the location of the absorber element, in which reactor the first stage of a water-splitting cycle proceeds for example. It is to be understood, however, that the present invention is in no way limited to such processes, but rather can be applied everywhere where high temperatures are desired at the location of the absorber element 6.

FIG. 2 schematically shows a particular embodiment of an individual collector 10, as can be used in a parabolic collector 1 (FIG. 1). The individual collector 10 has a frame 11 in which a pressure cell 12 made from flexible films is stretched. The upper film 13 is transparent for entering rays 3 (and naturally for exiting rays 3'). The lower film is constructed as concentrator 14 and to this end covered with a reflective layer made from preferably vapour-deposited aluminium which creates the reflected rays 3'.

Preferably, these films consist of Mylar® which is a known brand name for a biaxially orientated polyester film, for example polyethylene terephthalate.

Any other desired films or membranes known to the person skilled in the art can also be used, however. ETFE (ethylene tetrafluoroethylene) with a thickness of to 200 microns is conceivable for the upper transparent film 13, whilst particularly for the lower film 14, as mentioned, a Mylar vapour-coated with aluminium or else a PVC-, PU-, or silicone-coated textile fabric, such as polyester fabric or fibre-glass fabric or another suitable material which has a reflective layer, comes into consideration. The above-mentioned components can also be combined in a suitable manner. Textile fabrics of the stated type are for example known under the names Précontraint® 1002/1202/1302 from FERRARI or ATEX 3000 from Interglass.

Pressure cells for use in trough collectors are known to the person skilled in the art, for example from the above-mentioned WO 2008/037108.

The auxiliary lines 15, 15' and 16, 16' drawn in the figure illustrate the curvature of the concentrator 14 and show the curvature of the upper film 13 and of the concentrator 14 under operating pressure conditions of the pressure cell 12.

In this case, it can be seen that auxiliary lines 15, 15' running in a first direction have a more pronounced curvature than the auxiliary lines 16, 16' running in a second direction. These curvatures, which are different in a predetermined manner as described in the following, are each approximately spherical and determined by means of the contour of the frame 11 in which they are stretched (naturally, the operating pressure in the pressure cell 12 and the elasticity of the concentrator film or concentrator membrane are also relevant for the length of the radii of curvature).

The curvature of a pressure-loaded stretched film is described by means of the Henky function. This curvature is, as mentioned above, only approximately spherical or paraboloidal. Nonetheless, a film stretched in a manner according to the invention, as described below, concentrates the solar radiation in a better manner and thus sufficiently strongly in order to enable temperatures in the range mentioned.

In the present case, an elliptical contour of the frame 11 is preferred. As a result, the radii of curvature of all of the auxiliary lines 15' running (in the direction of the minor axis of the frame 11) are essentially of equal size, but are smaller than the radii of curvature of the auxiliary lines 16, 16' (running in the direction of the major axis of the frame 11). In the present case, for the sake of clarity, reference is made to radii of curvature, though, as mentioned, a spherical or paraboloidal curvature is only approximately constructed.

If an elliptical individual collector 10 of this type is then dimensioned for a provided installation location on the inner reflective surface 7 of the parabolic collector 1 (FIG. 1) and installed there, the concentrator 14 forms the paraboloidal wall section of the parabolic collector 1 with good precision. The installation location is in this case such that the major axis of the frame 11 is orientated along a surface line 1a, so that the auxiliary line 16' essentially coincides with a surface line 1a and the auxiliary lines 15' essentially coincide with circumferential lines 1b.

In this case, the real curvature of the concentrator 14 follows the shape of the reflective surface 7, which widens outwardly in a paraboloidal manner, with very good approximation in the first direction (auxiliary line 16') on the one hand and on the other hand also follows the outwardly widening circular circumference of the reflective surface 7 (FIG. 1) in the second direction (auxiliary lines 15').

Thus, the real curvature of a respective concentrator 14 (in the case of correct dimensioning and positioning of the frame 11, see below) is sufficiently well approximated to the ideal paraboloidal surface in order to concentrate the reflected rays 3' onto a focal point region which allows the required high temperatures in the absorber element 6.

At this point, it can be added that for example films known under the name Mylar are orthotropic, that is to say their e-modulus in the one direction is higher, e.g. by 10 to 15%, than in the other direction. This property can advantageously be used: preferably, the film is arranged in the elliptical frame 10, 22 in such a manner that the direction with the higher e-modulus coincides with the major axis. This improves the curvature in the second direction (auxiliary line 16') and leads to a measurably increased concentration or a focal point region made smaller in the corresponding direction.

FIG. 3 shows a preferred embodiment of an individual collector 20, the frame 21 of which is likewise constructed in an elliptical manner. In contrast with the individual collector 10 of FIG. 2, the individual collector 20 has a double pressure cell 22, formed from an external transparent film or membrane 23, a rear film or membrane 24 and the concentrator 25 which divides the space between the transparent film 23 and the rear film 24 into a front pressure zone 26 and a rear pressure zone 27. This configuration enables a low pressure difference Δp between the pressure zones 26 and 27 in the case of a sufficiently large overall pressure, in order to stabilise the double pressure cell 22 for use in a serviceable manner. The front pressure zone 26 of the double pressure cell 22 is placed under the pressure p+Δp of preferably ambient air by means of a pump 30, air making it from the front pressure zone 26 into the rear pressure zone 27 via a transfer passage 31. A further pump, preferably constructed as a fan 32, maintains the necessary low pressure difference Δp which is required in order to curve the concentrator 25 in the double pressure cell in a serviceable manner such that rays 3 are concentrated in a predetermined manner into a focal point region. This arrangement has the advantage that Δp is kept low and correspondingly a very thin concentrator film or concentrator membrane with smooth surface can be used, which supports a high concentration of the radiation 3.

An individual collector, which has a concentrator consisting of a flexible film, is essentially cheaper to produce than a conventional concentrator of the same quality.

In this case, the pressure cell, via which the concentrator is loaded with the operating pressure, can be constructed as an individual pressure cell 12 for example, as a double pressure cell 22 or even as a vacuum cell (not illustrated), one of its outer walls being constructed as a flexible concentrator in the case of the vacuum cell, which concentrator is pressed into the vacuum cell by means of the atmospheric pressure and so forms its curvature. The person skilled in the art can determine any desired design of a pressure cell appearing suitable to them for the actual case.

Cheaper assembly is not only achieved in the case of small concentrators with dimensions in the range of below 1 m or less, such as for example 0.5 m, but in particular also in the case of relatively large individual collectors with dimensions of the concentrator of 5 m, 10 m, 20 m or more. Accordingly, a parabolic collector, the inner reflective surface 7 (FIG. 1) of which is formed from a number of individual collectors of the type described above, can also be produced in large dimensions significantly less expensively than is the case if conventional concentrators would have to be used.

FIG. 4 shows a method for the production of a parabolic collector, the reflective surface of which has individual collectors with a concentrator which is loaded with pressure in operation, the concentrator of the individual collectors being constructed as a film or membrane curved differently in different directions. As described in connection with the FIGS. 2 and 3, an individual collector with elliptical stretching of the concentrator film (illustrated on the elliptical frame 11, 21 of the individual collectors 10, 20) fulfils these basic conditions particularly well, so that such an elliptically stretched concentrator film approximates a correspondingly elliptical wall section made up of a paraboloid (i.e. of the reflective surface of the parabolic collector 1 of FIG. 1) sufficiently well in order to enable the desired concentration of the radiation 3.

It is a prerequisite for this that the geometry of the elliptical stretching of the concentrator film is adapted to the location of the installation in the paraboloid.

This can be achieved as follows:

First, the parabolic collector is laid out in accordance with the desired properties in the actual case and so the reflective surface 7 of the parabolic collector 1 (FIG. 1) constituting a paraboloid 40 is determined. In the figure, the paraboloid 40 is illustrated in an xyz coordinate system, likewise its outline 41 in the xy plane is indicated in a dashed manner. The z axis coincides in this case with the axis of symmetry of the paraboloid 40, which thus stands perpendicularly on the outline plane formed by the xy plane.

A cylinder 43 is positioned onto an outline circle 42, which is located within the outline 41 of the paraboloid, the longitudinal axis of which cylinder runs parallel to the z axis of the coordinate system. Surface lines 44 of the cylinder 43 can be seen in the figure.

As the outline circle 42 lies within the outline 41 of the paraboloid 40, the cylinder 43 penetrates this, the intersection of the two bodies being an ellipse 46. The ellipse 46 in turn has the desired geometry of the stretching of a concentrator film in such a manner that this sufficiently approximates the corresponding wall section of the paraboloid 40 delimited by means of the ellipse 46: the ratio of the major axis of the ellipse obtained to its minor axis is such that the curvature of the concentrator film resulting therefrom fits in the direction of the circumference and in the direction of the surface line of the paraboloid.

The ellipse 46 therefore defines the frame 11, 21 (FIGS. 2 and 3) lying in the (ideal) paraboloid of the corresponding collector or the stretching for an individual collector 10, 20 (FIGS. 2 and 3). It additionally defines the installation location, which is connected with its geometry, of an individual collector 5 in the parabolic collector 1 (FIG. 1).

The ellipse 46 has the following properties: on the one hand, its major axis and therefore the major axis of a corresponding concentrator lies in a plane passing through the axis of symmetry of the parabolic collector 1. The minor axis standing perpendicularly on the major axis lies in a plane running perpendicular to the axis of symmetry of the collector.

FIG. 5 shows a method with which the arrangement of all of the individual collectors to be arranged in a parabolic collector can be determined. Illustrated is a view from above onto the outline plane xy with the outline 41 of the paraboloid 40. Lines 50, 51 and 52 form a pattern of equilateral triangles and intersect in nodes 53 which lie in the corners of these triangles. One of the nodes 53 lies preferably at the origin of the coordinate system xy. The nodes 53 are centre points of the outline circles 55, the radii of which are preferably selected in such a manner that the circles adjoin one another. For all outline circles lying completely within the outline 41 of the paraboloid 40, the intersection of the cylinder positioned thereon with the paraboloid and thus the geometry of an assigned individual collector can be determined.

As a result, the geometry and arrangement of all individual collectors 5 of the parabolic collector 1 (FIG. 1) are defined in this manner.

The person skilled in the art can then determine geometry and arrangement of the individual collectors in a given parabolic collector in accordance with the requirements in the actual case.

On the one hand, the arrangement of a node 53 at the origin of the coordinate system xy leads to it being possible to omit the individual collector possible at the origin of the paraboloid 40 (FIG. 4), as it would necessarily be located in the shade of the absorber element 6 (FIG. 1). Then, the spacing of the individual collectors from the origin can be selected in such a manner that only the location of shadow casting by means of the absorber element 6 (FIG. 1) is provided without individual collector. Finally, as mentioned, the radii of the outline circles 55 are preferably determined in such a manner that the circles 55 adjoin one another, whereby the percentage area of the outline circles 55 and the overall area of the outline 41 becomes as large as possible. This is then likewise true for the individual collectors obstructed in the parabolic collector, the percentage area of which formed on the surface of the paraboloid 40 (FIG. 4) formed by the parabolic collector likewise becomes as large as possible.

Finally, the person skilled in the art cannot provide the arrangement of the outline circles 55 on the corners of a(n) (equilateral) triangle, but rather can select another (symmetric or non-symmetric) pattern which is used for the optimisation of a determining parameter in the laying out of the parabolic collector, as appears appropriate in the actual case. It is also true that the radii of the outline circles are of different sizes in order to fill gaps between adjacent outline circles optimally or in order to also occupy the regions at the edge of the parabolic collector 1 with individual collectors.

In a preferred embodiment, the grid is selected in such a manner that a first group of individual collectors are arranged with the same spacing from one another and from the origin of the ideal paraboloid, that is to say annularly around the same. A second group is in turn arranged in the same manner, but with a larger spacing to the origin, and in such a manner that the inwardly extending ends of the individual collectors of the second group are placed between the individual collectors of the first group, and so the parabolic collector is densely occupied with individual collectors.

FIG. 6a shows a view of a first exemplary embodiment of a parabolic collector 60 according to the invention, the individual collectors 61 of which are integrated into a carrier structure 62 made from concrete. A construction of this type enables a simple and cheap assembly of a carrier structure for even large parabolic collectors with the above-mentioned diameters up to 30 m, 50 m or more, whilst at the same time individual collectors 61 can be used in a size seen as suitable by the person skilled in the art in accordance with the actual case. It is expected that a diameter of 15 to 20 m is already sufficient in order to provide both the required high temperatures and a power of 100 kW (15 m) or 200 kW (20 m).

For example, the width of the concentrators (that is to say the dimension of the minor axis, second direction) can be determined by the available film. Suitable films are today available essentially up to a width of 2 m, which (today) limits the width of the concentrators to 2 m, if a welding of a plurality of film webs is not provided. A welding is demanding from the point of view of production engineering if no impairment of the concentration of the concentrator produced in such a manner can be accepted.

It is known to the person skilled in the art for concrete constructions that large-area precise and complicated concrete structures can be produced simply with aluminium formwork for example.

The design according to the invention allows individual concentrators 61 of a wide range of sizes. At the same time, high powers can also be achieved by means of large parabolic collectors 60 at the high temperatures achievable according to the invention.

In the figure, dashed outline circles 69 are drawn in, which correspond to the outline circles 42 of FIG. 4.

FIG. 6b shows the parabolic collector 60 from above, so that the figure at the same time corresponds to its outline. Different individual collectors are designated with 61, 61' to 61'''' and 61*.

FIG. 6c shows the parabolic collector 60 in the section AA of FIG. 6b. The carrier structure 62 consisting of concrete is shown shaded. Vacuum chambers 63 and 64 which are formed by means of the concrete structure 62 and closed off by means of he concentrators 61' and 61'' can be seen. Suitable means for producing a vacuum, such as for example hose connections to a central vacuum pump (which the person skilled in the art selects and dimensions in a suitable manner in the actual case) are omitted so as to not overload the figure. Due to the vacuum in the vacuum chambers 63, 64, the respective concentrator 61', 61'' is loaded with pressure by means of the atmospheric pressure, so that the predetermined curvature of the concentrators 61', 61'' forms.

FIG. 6d shows the parabolic collector 60 in the section BB of FIG. 6b. The vacuum chambers 65 to 68 for the concentrators assigned to them in each case can now be seen.

FIG. 7 shows a further exemplary embodiment of a parabolic collector 70 according to the invention with individual collectors 71, 72 which have a length of the major axis in the region of 500 mm. The individual collectors 71, 72 are arranged on a single metal frame 75. A further frame 76 carries an absorber element which is not shown, so as to not overload the figure.

Using the example of the individual concentrator 71 as an example, the construction of the individual concentrators 71, 72 used in the parabolic collector 70 is shown as follows:

A concentrator film 76 is stretched into a frame 77 which consists of an upper ring 78 and a lower ring which cannot be seen, the rings clamping the concentrator film 76 between them and being screwed together. The lower ring in turn carries a base plate which likewise cannot be seen and forms a vacuum chamber together with the lower ring. Suitable means for the production of the vacuum, such as vacuum hoses and a central vacuum pump are likewise omitted so as to not overload the figure.

In addition, the concentrator film 76 and the base plate are illustrated in a transparent manner so that the fixing of the individual collector 71 on the metal frame 75 becomes visible: vertically protruding carrier elements 80 are arranged on a carrier 79 of the metal frame 75, on which carrier elements a T-shaped attachment 82 is linked such that it can pivot about an axis 81, which attachment for its part carries the base plate of the individual collector 71.

By means of this arrangement, the individual collectors 71, 72 can be orientated in a simple manner for example with a jig. The exceptionally simple design allows a beneficial assembly under simple conditions.

The frames 77 of the individual collectors 71, 72 are constructed in an elliptical manner, as is described above in connection with the production method particularly of FIG. 4. In the present small arrangement with individual collectors 71, 72 in the "bottom region" of the paraboloid, the deviation of the length of the major axis from the minor axis cannot be seen in the figure realised to scale. In accordance with the method according to the invention, the minor axis is shorter in comparison with the major axis, the further the relevant concentrator is from the origin of the paraboloid.

The parabolic collector 70 has a ratio of focal length to diameter of approx. 1 (on the basis of the individual collectors 71, 72 arranged on a grid, a fixed diameter does not exist in the sense of a circle diameter). As a result, the concentration factor in the present arrangement is approx. 4000.

If the ratio of focal length to diameter of approx. 0.5 is selected, the concentration measured computationally at the time of the registration is approx. 6000, with an expected temperature of 2200 to 2700° C.

The invention claimed is:

1. A parabolic collector for concentration of solar radiation, comprising:
    a reflecting surface that approximates an ideal parabolic shape, the reflecting surface comprising a plurality of individual collectors;
    wherein each collector of the plurality of individual collectors have a concentrator made from a flexible foil which, in operation, can be loaded with pressure;
    wherein each concentrator of each collector, under operating pressure conditions, is curved differently in a predetermined manner in a first and in a second direction over a corresponding extent of each concentrator to approximate the ideal parabolic shape; and
    wherein a curvature in the first direction is more pronounced than a curvature in the second direction.

2. The parabolic collector according to claim 1, wherein the plurality of individual collectors have a concentrator with elliptical circumference, a major axis of which lies in a plane passing through an axis of symmetry of the collector and wherein the first and second directions run perpendicularly to one another.

3. The parabolic collector according to claim 2, wherein a minor axis of the concentrator lies in a plane running perpendicularly to the axis of symmetry of the collector.

4. The parabolic collector according to claim 1, wherein an elliptically constructed edge of the concentrator of the plurality of individual collectors lies essentially on a surface of the collector corresponding to the ideal parabolic shape.

5. The parabolic collector according to claim 1, wherein the plurality of individual collectors are provided as collectors with a pressure cell in which the concentrator is stretched and which divides the pressure cell into two zones, between which a pressure difference prevails under operating pressure conditions, by means of which pressure difference the concentrator is loaded in a serviceable manner.

6. The parabolic collector according to claim 1, wherein individual collectors are provided as collectors with a vacuum cell in which the concentrator is stretched and, under operating pressure conditions, is subjected to a pressure difference by means of external pressure, by means of which pressure difference it is loaded in a serviceable manner.

7. The parabolic collector according to claim 1, wherein in the same, a first group of individual collectors are arranged with similar spacing from one another, adjoining one another, and each with the same spacing from an origin of the ideal parabola, and at least one further group of individual collectors is provided with the same spacing to one another and the same spacing to the origin, the individual collectors of which group piece by piece protrude into one of the intermediate spaces, formed by means of adjacent individual collectors of the first group, in such a manner that the collector is densely occupied with individual collectors.

8. The parabolic collector according to claim 1, wherein the plurality of individual collectors are integrated into a carrier structure made from concrete.

9. The parabolic collector according to claim 8, wherein the carrier structure covers the plurality of individual collectors outwardly, in such a manner that, as a result, a vacuum cell for the plurality of individual collectors is formed.

10. An individual collector which has a concentrator formed from a flexible foil, which concentrator is for its part loaded in operation by means of pressure and under operating pressure conditions reflects solar radiation to an absorber element;
    wherein the concentrator is, under operating pressure conditions, curved in a predetermined manner in each case over its corresponding extent in a first direction, such that reflected solar radiation is reflected by means of this curvature into a focal line region;
    wherein, in a second direction, the concentrator is likewise, but differently curved, such that due to this curvature, a focal line region of this section is at least shortened; and
    wherein the individual collector is shaped such that, when the individual collector is discretely positioned in concert with further individual collectors, a parabolic reflecting surface is approximated.

11. The individual collector according to claim 10, wherein the concentrator, in the second direction, is curved in such a manner that the focal line region shortens to a focal point region and wherein the concentrator is elliptically stretched.

12. The individual collector according to claim 10, wherein the concentrator consists of an orthotropic film with an e-modulus which is different in different directions, and wherein the concentrator is orientated and stretched in such a manner that a direction with a higher e-modulus lies parallel to a direction of its longer extent.

13. A method for a production of a parabolic collector according to claim 1, wherein in an outline of a collector orientated perpendicularly to its outline plane, the plurality of individual collectors of the collector are arranged via their outline circles and therefrom, true dimensions of the individual collectors are determined from an intersection which results in penetration of a cylinder standing on the respective outline circle with the ideal parabolic shape of the collector.

14. The method according to claim 13, wherein in the outline, centre points of the outline circles of the plurality of individual collectors are arranged in nodes of a grid which is laid in the outline of the collector, and wherein the grid and a radii of the outline circles are determined in such a manner that an area percentage of the outline circles is maximised on the surface of the outline.

15. The method according to claim 14, wherein the grid is formed from equilateral triangles, wherein a node lies at the origin of the ideal parabolic shape and the radii of the outline circles are selected in such a manner that the individual collectors arranged in the collector adjoin one another.

16. The method according to claim 13, wherein a ratio of focal length to diameter is determined to 1.

17. A method for production of an individual collector according to claim 10, which has a concentrator with an orthotropic film, the e-modulus of which is higher in one direction than in another direction running transversely to this one, and wherein the orthotropic film is orientated in the individual collector in such a manner that the direction with the higher e-modulus coincides with the direction of the largest spacing of the concentrator, in the case of an elliptical construction with the major axis of the stretched concentrator.

18. The method according to claim 13, wherein a ratio of focal length to diameter is less than 1.

19. The method according to claim 13, wherein a ratio of focal length to diameter is in the range of 0.4 to 0.75.

20. The method according to claim 13, wherein a ratio of focal length to diameter is 0.5.

* * * * *